United States Patent
Kim et al.

(10) Patent No.: US 9,008,440 B2
(45) Date of Patent: Apr. 14, 2015

(54) COMPONENT RECOGNIZING APPARATUS AND COMPONENT RECOGNIZING METHOD

(75) Inventors: Kye Kyung Kim, Daegu (KR); Woo Han Yun, Daejeon (KR); Hye Jin Kim, Daejeon (KR); Su Young Chi, Daejeon (KR); Jae Yeon Lee, Daejeon (KR); Mun Sung Han, Daejeon (KR); Jae Hong Kim, Daejeon (KR); Joo Chan Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 183 days.

(21) Appl. No.: 13/545,629

(22) Filed: Jul. 10, 2012

(65) Prior Publication Data

US 2013/0163858 A1    Jun. 27, 2013

(30) Foreign Application Priority Data

Dec. 21, 2011 (KR) .................. 10-2011-0139610

(51) Int. Cl.
 *G06K 9/48* (2006.01)
 *G06K 9/62* (2006.01)
 *G06K 9/00* (2006.01)
 *G06T 7/00* (2006.01)

(52) U.S. Cl.
 CPC .............. *G06T 7/0044* (2013.01); *G06K 9/00* (2013.01); *G06K 2209/19* (2013.01); *G06T 7/0083* (2013.01); *G06T 2207/30164* (2013.01)

(58) Field of Classification Search
 None
 See application file for complete search history.

(56) References Cited

U.S. PATENT DOCUMENTS

| | | | |
|---|---|---|---|
| 5,872,863 A | 2/1999 | Tsuboi et al. | |
| 2006/0008151 A1* | 1/2006 | Lin et al. | 382/190 |
| 2006/0258938 A1* | 11/2006 | Hoffman et al. | 600/424 |
| 2012/0300078 A1* | 11/2012 | Ogata et al. | 348/148 |

FOREIGN PATENT DOCUMENTS

JP       2010-016154      * 8/2011  ............... G06T 1/00

OTHER PUBLICATIONS

Zhou et al, "An Improved Adaptive Document Image Binarization Method," 2009, Image and Signal Processing, 2009. CISP '09. 2nd International Congress on, pp. 1-5.*
"The Laplacian of Gaussian" [online]. Wikipedia, 2014 [retrieved Mar. 17, 2014 ]. Retrieved from the Internet: < URL: http://en.wikipedia.org/wiki/Laplacian_of_Gaussian >, pp. 1-2.*
Wang et al, "An HOG-LBP human detector with partial occlusion handling," 2009, Computer Vision, IEEE 12th International Conference on, pp. 1-8.*

* cited by examiner

*Primary Examiner* — Bhavesh Mehta
*Assistant Examiner* — David F Dunphy
(74) *Attorney, Agent, or Firm* — Nelson Mullins Riley & Scarborough LLP; Anthony A. Laurentano, Esq.; Lewis Lee, Esq.

(57) ABSTRACT

Disclosed are a component recognizing apparatus and a component recognizing method. The component recognizing apparatus includes: an image preprocessing unit configured to extract component edges from an input component image by using a plurality of edge detecting techniques, and detect a component region by using the extracted component edges; a feature extracting unit configured to extract a component feature from the detected component region, and create a feature vector by using the component feature; and a component recognizing unit configured to input the created feature vector to an artificial neural network which has learned in advance to recognize a component category through a plurality of component image samples, and recognize the component category according to a result.

14 Claims, 5 Drawing Sheets

COMPONENT RECOGNIZING APPARATUS AND COMPONENT RECOGNIZING METHOD

CROSS-REFERENCE TO RELATED APPLICATIONS

This application claims priority to and the benefit of Korean Patent Application No. 10-2011-0139610 filed in the Korean Intellectual Property Office on Dec. 21, 2011. the entire contents of which are incorporated herein by reference.

TECHNICAL FIELD

The present invention relates to a component recognizing apparatus, and more particularly, to a component recognizing apparatus which extracts a component region from a component image acquired by a camera, extracts a feature vector from the extracted component region, and estimates a category and a posture angle of the component by using the extracted feature vector, and a component recognizing method.

BACKGROUND ART

Recognition of components in factory automating systems has been used as a measure for minimizing a burden of simple and repetitive works or lowering productivity due to a decrease of concentration of a worker. Recognition of components has been used to identify good and defective products or to mount various components in small-scale factories producing various components. In recent years, due to development of image recognizing technologies and introduction of cell production methods for producing various types of products in one line, a need to estimate a type and a posture angle of a component and accurately mount the component is being gradually increased.

The existing component recognizing method mainly uses a model based matching method using a comparison of pixels of a component image, and a rule based method where after being extracted based on design information to create a standard model, a contour line of a component is compared with characteristics of an input component image.

However, according to the existing method, since a new component recognizing algorithm needs to be developed whenever a new product is produced by applying a component recognizing method specified to recognize of a specific component, it is difficult to promptly and efficiently apply a component recognizing method to a new component production system due to the time for developing the algorithm. Due to noise of an input image caused by an influence of illumination and a complexity of a matching algorithm, a real time processing is difficult to realize and a component recognition rate is also lowered.

In order to solve the problem, a need for a component recognizing method less sensitive to an influence of illumination and a component recognizing method generally applicable to recognition of various types of components is increasing.

In particular, due to illuminations variously changing according to an actual production environment and various types of components, it has been more difficult to effectively apply a component recognizing technology to an actual field. Therefore, a component recognizing method which can be commonly used general even when a type of a target component is changed or strong against an influence of illumination and a posture angle at which a component is positioned is acutely required.

SUMMARY OF THE INVENTION

The present invention has been made in an effort to provide a component recognizing apparatus, and more particularly, to a component recognizing apparatus which extracts a component region from a component image acquired by a camera, extracts a feature vector from the extracted component region, and estimates a type and a posture angle of the component by using the extracted feature vector, and a component recognizing method.

However, the object of the present invention is not limited to the above-described items, but the other objects of the present invention will be clearly understood by those skilled in the art from the following description.

An exemplary embodiment of the present invention provides a component recognizing apparatus, including: an image preprocessing unit configured to extract component edges from an input component image by using a plurality of edge detecting techniques, and detect a component region by using the extracted component edges; a feature extracting unit configured to extract a component feature from the detected component region, and create a feature vector by using the component feature; and a component recognizing unit configured to input the created feature vector to an artificial neural network which has learned in advance to recognize a component category through a plurality of component image samples, and recognize the component category according to a result.

The edge detecting techniques may include a second derivative calculation technique and a local adaptive binarization technique.

After detecting a first component edge by applying the second derivative calculation technique to the component image and detecting a second component edge by applying the local adaptive binarization technique to the component image, the image preprocessing unit may combine the detected first component edge and the detected second component edge, and detect the component region according to a combination result.

After removing noise by performing filtering for smoothing the component image, the image preprocessing unit may detect the first component edge by applying the second derivative calculation technique to the smoothed component image.

After removing noise by performing filtering for smoothing the component image, the image preprocessing unit may detect the second component edge by applying the local adaptive binarization technique to the smoothed component image.

After extracting a first component feature from a binary component region where the component region is converted into a binary image and extracting a second component feature from a grey component region where the component region is converted into a grey image, the feature extracting unit may combine the detected first component feature and the detected second component feature, and create the feature vector according to a combination result.

The component recognizing apparatus may further include: an angle estimating unit configured to estimate a posture angle of the component by using a main line element of a silhouette of the component whose category has been recognized.

The angle estimating unit may compare the main line element of the silhouette of the component whose category has been recognized and a main line element of a silhouette of a 3D model component stored in a database in advance, and estimate the posture angle of the component according to a comparison result.

Another exemplary embodiment of the present invention provides a component recognizing apparatus, including: an image preprocessing unit configured to extract a component edge from an input component image by using a predetermined edge detecting technique, and detect a component region by using the extracted component edge; a feature extracting unit configured to extract a component feature from the detected component region, and create a feature vector by using the extracted component feature; and a component recognizing unit configured to input the created feature vector to an artificial neural network which has learned in advance to recognize a component category through a plurality of component image samples, and recognize the component category according to a result.

The edge detecting technique may be one of a second derivative calculation technique and a local adaptive binarization technique.

Yet another exemplary embodiment of the present invention provides a component recognizing method, including: extracting component edges from an input component image by using a plurality of edge detecting techniques, and detecting a component region by using the extracted component edges; extracting a component feature from the detected component region, and creating a feature vector by using the extracted component feature; and inputting the created feature vector to an artificial neural network which has learned in advance to recognize a component category through a plurality of component image samples, and recognizing the component category according to a result.

The edge detecting techniques may include a second derivative calculation technique and a local adaptive binarization technique.

In the detecting of the component region, after a first component edge is detected by applying the second derivative calculation technique to the component image and a second component edge is detected by applying the local adaptive binarization technique to the component image, the detected first component edge and the detected second component edge may be combined with each other, and the component region may be detected according to a combination result.

In the detecting of the component region, after noise is removed by performing filtering for smoothing the component image, the first component edge may be detected by applying the second derivative calculation technique to the smoothed component image.

In the detecting of the component region, after noise is removed by performing a filtering for smoothing the component image, the second component edge may be detected by applying the local adaptive binarization technique to the smoothed component image.

In the creating of the feature vector, after a first component feature is extracted from a binary component region where the component region is converted into a binary image and a second component feature is extracted from a grey component region where the component region is converted into a grey image, the detected first component feature and the detected second component feature may be combined with each other, and the feature vector is created according to a combination result.

The component recognizing method of claim may further include: estimating a posture angle of the component by using a main line element of a silhouette of the component whose category has been recognized.

In the estimating of the posture angle, the main line element of the silhouette of the component whose category has been recognized and a main line element of a silhouette of a 3D model component stored in a database in advance may be compared, and the posture angle of the component may be estimated according to a comparison result.

Still another exemplary embodiment of the present invention provides a component recognizing method, including: extracting a component edge from an input component image by using a predetermined edge detecting technique, and detecting a component region by using the extracted component edge; extracting a component feature from the detected component region, and creating a feature vector by using the extracted component feature; and inputting the created feature vector to an artificial neural network which has learned in advance to recognize a component category through a plurality of component image samples, and recognizing the component category according to a result.

The edge detecting technique may be one of a second derivative calculation technique and a local adaptive binarization technique.

As described above, the present invention can extract a component region from a component image acquired by a camera, extract a feature vector from the extracted component region, and estimate a type and a posture angle of the component by using the extracted feature vector, thereby increasing a mounting rate of the component.

The present invention also suggests a new measure of extracting a component region from a component image acquired by a camera, extracting a feature vector from the extracted component region, and estimating a type and a posture angle of the component by using the extracted feature vector, thereby enhancing productivity of a product.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, a component recognizing apparatus and a component recognizing method according to exemplary embodiments of the present invention will be described with reference to FIGS. 1 to 8. Components essential to understand an operation and an action of the present invention will be mainly described in more detail. Throughout the specification, like reference numerals proposed in each drawing denotes like components. In describing the present invention, well-known functions or constructions will not be described in detail since they may unnecessarily obscure the understanding of the present invention.

In particular, the present invention suggests a new measure of extracting a component region from a component image acquired by a camera, extracting a feature vector from the extracted component region, and estimating a category and a posture angle of the component by using the extracted feature vector.

Figure 1:
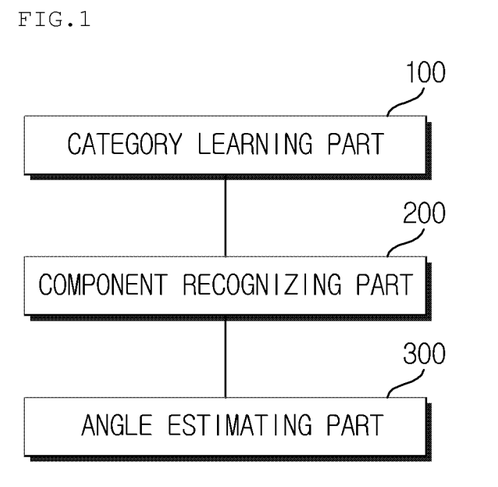
FIG. 1 is a block diagram illustrating a component recognizing apparatus according to an exemplary embodiment of the present invention.

FIG. 1 is a block diagram illustrating a component recognizing apparatus according to an exemplary embodiment of the present invention.

As illustrated in FIG. 1, the component recognizing apparatus according to the present invention includes a category learning part 100, a component recognizing part 200, and an angle estimating part 300.

The category learning part 100 may classify and learn of a category of a component according to a type and a posture angle of the component.

Figure 2:
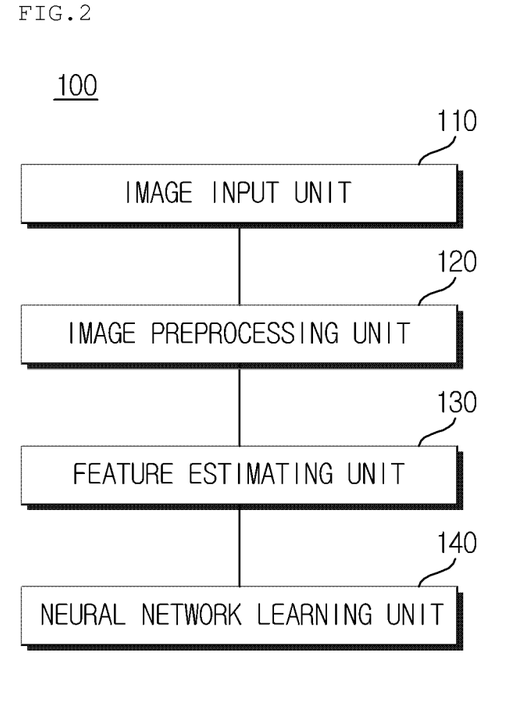
FIG. 2 is a block diagram illustrating a detailed configuration of a category learning part 100 illustrated in FIG. 1.

FIG. 2 is a block diagram illustrating a detailed configuration of a type learning unit 100 illustrated in FIG. 1.

As illustrated in FIG. 2, the category learning part 100 according to the present invention may includes an image input unit 110, an image preprocessing unit 120, a feature extracting unit 130, and a neural network learning unit 140.

The image input unit 110 may receive various component image samples acquired by a camera. Here, the component image samples may be images acquired by changing an illumination state and changing a rotation angle according to information regarding a posture where the component can be positioned.

Figure 3:
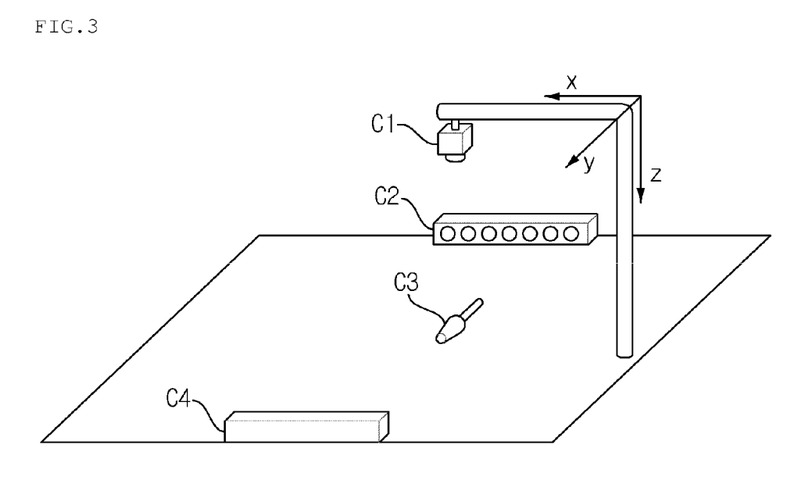
FIG. 3 is a schematic diagram for explaining a principle of acquiring a component image according to the exemplary embodiment of the present invention.

FIG. 3 is a schematic diagram for explaining a principle of acquiring a component image according to the exemplary embodiment of the present invention.

As illustrated in FIG. 3, the image input unit 110 according to the present invention may acquire a component image from a camera C1 in a work die to which illumination units C2 and C4 are attached to construct a component image database. The image input unit 110 may estimate a posture where a component C3 can be positioned to acquire a component image according to an estimation result while changing a rotation angle of the component in the Z-axis.

The image acquiring unit 110 according to the present invention may acquire component images in various illumination environments by applying different illumination conditions in units of hours to construct a database.

The image preprocessing unit 120 may perform an image preprocessing to minimize influences of surrounding illuminations. That is, the image preprocessing unit 120 extracts component edges by using a plurality of edge detecting techniques, and detects a component region by using the extracted component edges.

In this case, the edge detecting techniques may include a second derivative calculation technique and a local adaptive binarization technique.

Figure 4:
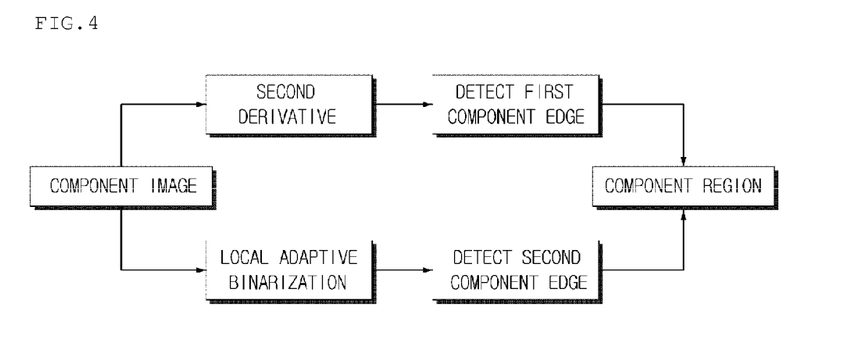
FIG. 4 is a schematic diagram for explaining a principle of detecting a component region according to the exemplary embodiment of the present invention.

FIG. 4 is a schematic diagram for explaining a principle of detecting a component region according to the exemplary embodiment of the present invention.

As illustrated in FIG. 4, the image preprocessing unit 120 applies the second derivative calculation technique and the local adaptive binarization technique to the component image to detect component edges. That is, the image preprocessing unit 120 may detect a first component edge by applying the second derivative calculation technique to the component image and may detect a second component edge by applying the local adaptive binarization technique to the component image. The image preprocessing unit 120 combines the detected first component edge and second component edge to make the component edges more accurate and detect a component region.

In this case, the present invention detects the component edges by using the second derivative calculation technique and the local adaptive binarization technique, but is not limited thereto and various techniques may be applied.

Hereinafter, a method of detecting a component edge will be described in more detail.

1) When a component edge is extracted by applying a local adaptive binarization technique, the image preprocessing unit 120 may perform a filtering for smoothing a component image to remove noise, first.

The image preprocessing unit 120 may segment the smoothed component image into a predetermined size, create integral images for the segmented images, and extract a component edge by using a representative pixel value of the created integral image.

Figure 5:
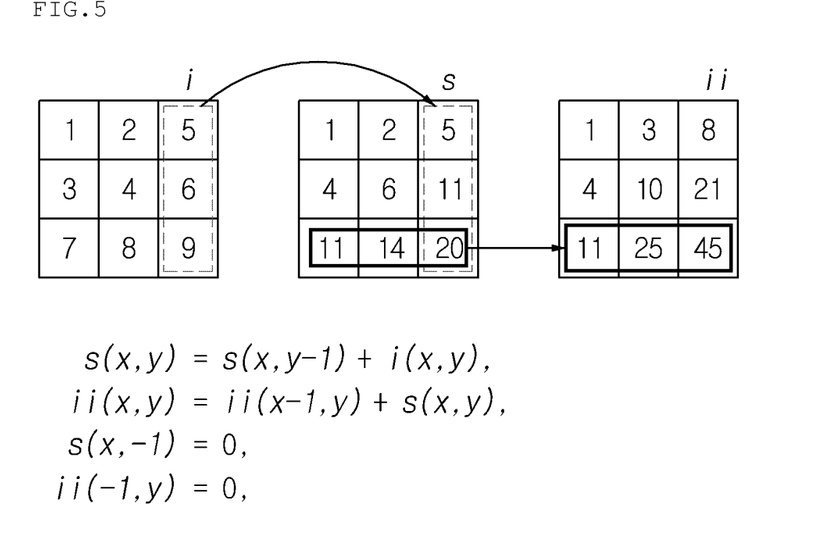
FIG. 5 is a schematic diagram for explaining a principle of calculating a representative pixel value according to the exemplary embodiment of the present invention.

FIG. 5 is a schematic diagram for explaining a principle of calculating a representative pixel value according to the exemplary embodiment of the present invention.

As illustrated in FIG. 5, (a) shows pixel values of pixels of the segmented image, (b) shows that the pixel values of the pixels are accumulated and added longitudinally, and (c) shows that the pixel values of the pixels are accumulated and added transversely.

The largest pixel value of (c) created through the process becomes a representative pixel value of the segmented region.

Through this process, the image preprocessing unit 120 may calculate a representative pixel value for all the segmented regions of the component image, binarize the component image by using the calculated representative pixel value, an average pixel value or a standard deviation, and extract a component edge from the binarized component image.

As described above, if a mask image is convoluted to an integral image, an amount of calculations is reduced as compared with the case of convoluting a mask image to an original image, which increases processing speed. As the present invention performs binarization by using pixel values of local regions, it is less influenced by illumination as compared with a global binarization method.

2) When a component edge is detected by applying a second derivative calculation technique, the image preprocessing unit 120 may perform filtering for smoothing a component image to remove noise, first.

The image preprocessing unit 120 may calculate the second derivative of the smoothed component image to extract a component edge by using the second derivative value calculated from the calculation result.

The second derivative calculation technique obtains derivative values which are rates of change of an arbitrary pixel (x,y) of the component image in various directions, and detects a component edge by using the obtained derivative values. The edge detecting technique using the second derivative calculation reduces a disadvantage of a first derivative sensitively reacting in a region where an edge is present to react insensitively and the detected edges are not broken but form a continuous closed curve, which is effective in extracting an object region influenced by illumination.

The feature extracting unit 130 may extract a component feature in a detected component region, for example, a network feature representing a pixel distribution of segmented regions which can reflect a structural feature and a statistical feature of a component, a distance feature representing horizontal and vertical distances from a circumscribing rectangle of the component, an orientation feature, and a moment value, and may create a feature vector by using the extracted component feature. That is, after extracting a first component feature in a binary component region obtained by converting the detected component region to a binary image and extracting a second component feature in a grey component region obtained by converting the component region to a grey image, the feature extracting unit 130 may extract a feature vector by using the extracted first component feature and second component feature.

Hereinafter, a method of extracting a feature vector will be described in more detail.

For example, 1) when a component feature is extracted from a binary component region, the feature extracting unit 130 converts the component region to a binary image to extract a component feature from the created binary component region. That is, the feature extracting unit 140 normalizes a binary component region into a predetermined size, and segments the normalized binary component region into a preset number of segmented regions to extract a component feature from the segmented regions.

For example, 2) when a component feature is extracted from a grey component region, the feature extracting unit 130 converts the component region to a grey image to extract a component feature from the created grey component region. That is, the feature extracting unit 130 segments a grey component image into a preset number of segmented regions to extract a histogram distribution for pixel and brightness values distributed in the segmented regions.

In this case, since the histogram distribution includes a histogram distribution for a background region other than a component region, a histogram distribution of the component region can be reflected further by setting a weight of the portion corresponding to the background region to be lower than the portion corresponding to the component region.

Since an original component feature of the component region can be changed by the influence of illumination, some histogram values can be excluded from the feature by analyzing the histogram distribution for the component region.

The neural network learning unit 140 may input the created feature vector to an artificial neural network to teach the artificial neural network. Here, teaching the neural network refers to renewal of weights of all nodes constituting a neural network. The neural network learning may be repeated within a range where an error value of an output node is within an allowable error range or within a predetermined repetition range.

In this case, the artificial neural network may be widely used as a pattern classifier due to excellent classifying performances and generalization characteristics. An input layer constituting the artificial neural network includes nodes corresponding to the order of the feature vector, and an output layer includes nodes corresponding to the number of component categories. Since the number of concealed nodes used in the artificial neural network influences recognition performance, more time is consumed in teaching the neural network as the number of concealed nodes increases.

The feature vector may be provided to the input layer of the artificial neural network. Since it is impossible to accurately extract and recognize an edge of a component without any error when a component image is actually recognized, a feature vector may be input to an artificial neural network to teach the artificial neural network while moving a component region vertically and horizontally, considering a pixel error range caused as a result of extraction of a component region.

When the artificial neural network is taught, the component image may be selected at random and provided to an input side so that a weight of the artificial neural network cannot be leaned toward a specific component. As a recognition result of the artificial neural network, an output node having a maximum value may be selected. In this process, a reference, for example, an output value selecting threshold value needs to be set such that a result of misrecognizing another component category is prevented. In general, since it is more necessary to process a non-recognition result rather than a misrecognition result in the industrial field, reliability for whether or not a recognition result value will be accommodated is most important to apply a recognition technology to the actual field.

The component recognizing unit 200 may recognize a component from a component image acquired by a camera.

Figure 6:
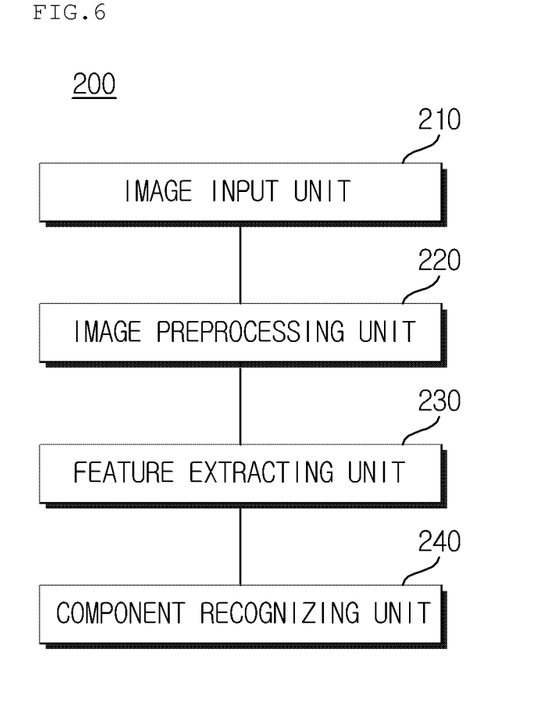
FIG. 6 is a block diagram illustrating a detailed configuration of a component recognizing part 200 according to the exemplary embodiment of the present invention.

FIG. 6 is a block diagram illustrating a detailed configuration a component recognizing part 200 according to an exemplary embodiment of the present invention.

As illustrated in FIG. 6, the component recognizing part 200 according to the present invention may include an image input unit 210, an image preprocessing unit 220, a feature extracting unit 230, and a component recognizing unit 240.

The image input unit 210 may receive a target component image acquired by a camera.

The image preprocessing unit 220 may perform image preprocessing to an input component image to minimize influences of surrounding illuminations. That is, the image preprocessing unit 220 extracts component edges from the component image by using a plurality of edge detecting techniques, and detects a component region by using the extracted component edges.

In this case, the edge detecting techniques may include a second derivative edge detecting technique and a local adaptive binarization technique.

The feature extracting unit 130 may extract a component feature in a detected component region, for example, a network feature representing a pixel distribution of segmented regions which can reflect a structural feature and a statistical feature of a component, a distance feature representing horizontal and vertical distances from a circumscribing rectangle of the component, an orientation feature, and a moment value, and may create a feature vector by using the extracted component feature. Here, the component region may include a binary component region and a grey component region.

The component recognizing unit 240 inputs the created feature vector into the taught artificial neural network to recognize the component category through a plurality of component image samples to obtain a recognition result. In this case, references such as an output value selecting threshold value and an output value difference comparison are set such that a result of misrecognizing another component category is rejected, to obtain a final recognition result.

The angle estimating unit 300 may estimate a posture angle by using a silhouette of the component whose category has been recognized.

Figure 7:
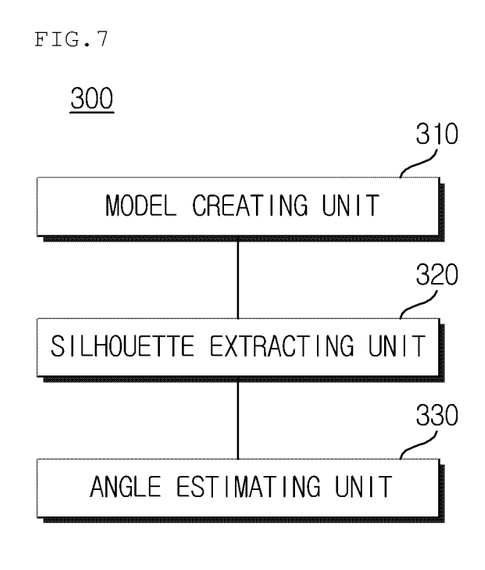
FIG. 7 is a block diagram illustrating a detailed configuration of an angle estimating part 300 according to the exemplary embodiment of the present invention.

FIG. 7 is a block diagram illustrating a detailed configuration of an angle estimating unit 300 according to an exemplary embodiment of the present invention.

As illustrated in FIG. 7, the angle estimating part 300 according to the present invention may include a model creating unit 310, a silhouette extracting unit 320, and an angle estimating unit 330.

The model creating unit 310 may create 3D models of various components to estimate posture angles of the components.

The silhouette extracting unit 320 may extract a silhouette of the component whose category has been recognized, that is, a main line element of the silhouette.

The angle estimating unit 330 compares a main line element of the silhouette whose component has been extracted and a main line element of the silhouette of the component of the 3D model to estimate a posture angle of the component according to the comparison result.

Figure 8:
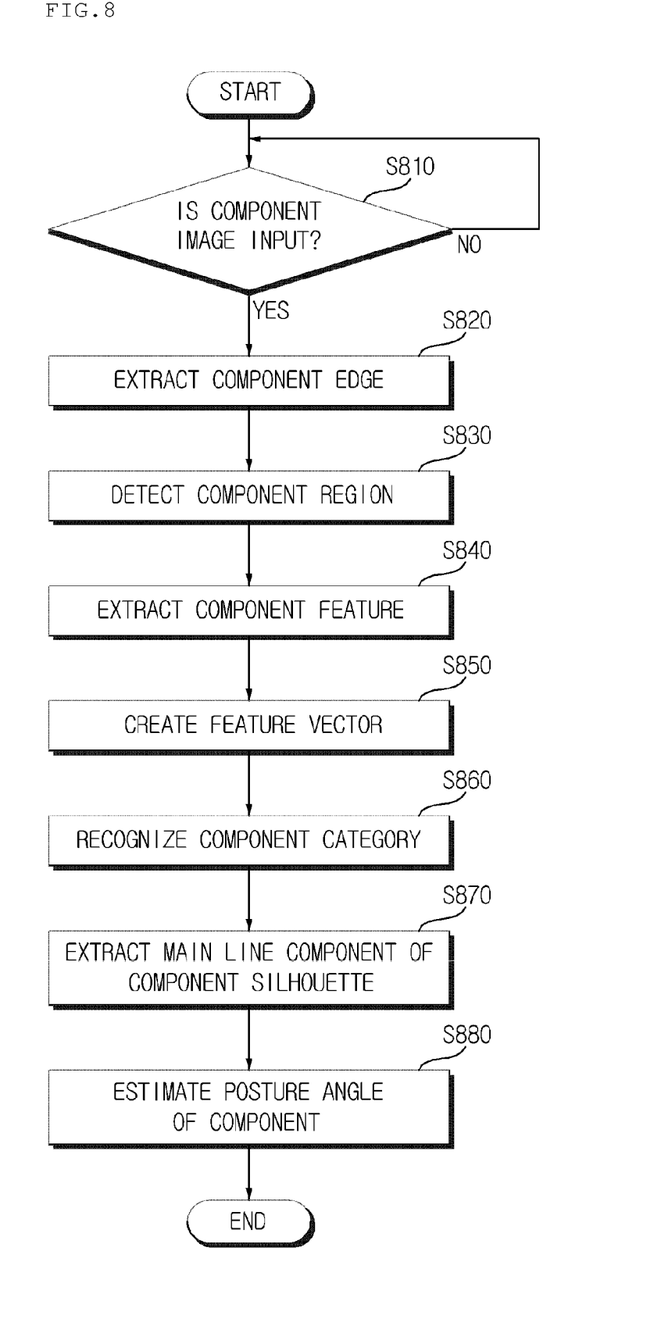
FIG. 8 is a flowchart illustrating a component recognizing method according to an exemplary embodiment of the present invention.

FIG. 8 is a flowchart illustrating a component recognizing method according to an exemplary embodiment of the present invention.

As illustrated in FIG. 8, if an apparatus for recognizing a component (hereinafter, referred to as a component recognizing apparatus) according to the present invention receives a target component image acquired by a camera (S810), the apparatus extracts component edges from the component image by using a plurality of edge detecting techniques (S820), and may detect a component region by using the extracted component edges (S830).

That is, after detecting a first component edge by applying the second derivative calculation technique to the component image and detecting a second component edge by applying the local adaptive binarization technique to the component image, the component recognizing apparatus combines the detected first component edge and second component edge to detect a component region.

Next, the component recognizing apparatus may extract a component feature from the detected component region (S840), and may create a feature vector by using the extracted component feature (S850).

That is, after extracting a first component feature in a binary component region obtained by converting the detected component region to a binary image and extracting a second component feature in a grey component region obtained by converting the component region to a grey image, the component recognizing apparatus may create a feature vector by using the extracted first component feature and second component feature.

Next, the component recognizing apparatus inputs the created feature vector into the taught artificial neural network to recognize the component category through a plurality of component image samples to recognize a category of the component through a recognition result (S860).

The component recognizing apparatus may extract a silhouette of the component whose category has been recognized, that is, a main line element of the silhouette (S870).

Next, the component recognizing apparatus may compare a main line element of the silhouette of the extracted component and a main line element of the silhouette of the component of the 3D model which is stored in a database in advance to estimate a posture angle of the component according to the comparison result (S880). Meanwhile, the exemplary embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A component recognizing apparatus, comprising one or more processors configured to embody a plurality of functional units including:
    an image preprocessing unit configured to extract component edges from an input component image by using a plurality of edge detecting techniques, and detect a component region by using the extracted component edges;
    a feature extracting unit configured to extract a component feature from the detected component region, and create a feature vector by using the component feature; and a component recognizing unit configured to input the created feature vector to an artificial neural network which has learned in advance to recognize a component category through a plurality of component image samples, and recognize the component category according to a result, wherein after extracting a first component feature from a binary component region when the component region is converted into a binary image and extracting a second component feature from a grey component region when the component region is converted into a grey image, the feature extracting unit combines the detected first component feature and the detected second component feature, and creates the feature vector therefrom, wherein the first component feature is a first component edge and the second component feature is a second component edge, and wherein the edge detecting techniques include a second derivative calculation technique and a local adaptive binarization technique.

2. The component recognizing apparatus of claim 1, wherein after detecting a first component edge by applying the second derivative calculation technique to the component image and detecting a second component edge by applying the local adaptive binarization technique to the component image, the image preprocessing unit combines the detected first component edge and the detected second component edge, and detects the component region according to a combination result.

3. The component recognizing apparatus of claim 2, wherein after removing noise by performing filtering for smoothing the component image, the image preprocessing unit detects the first component edge by applying the second derivative calculation technique to the smoothed component image.

4. The component recognizing apparatus of claim 2, wherein after removing noise by performing filtering for smoothing the component image, the image preprocessing unit detects the second component edge by applying the local adaptive binarization technique to the smoothed component image.

5. The component recognizing apparatus of claim 1, further comprising:
an angle estimating unit configured to estimate a posture angle of the component by using a main line element of a silhouette of the component whose category has been recognized.

6. The component recognizing apparatus of claim 5, wherein the angle estimating unit compares the main line element of the silhouette of the component whose category has been recognized and a main line element of a silhouette of a 3D model component stored in a database in advance, and estimates the posture angle of the component according to a comparison result.

7. A component recognizing apparatus, comprising one or more processors configured to embody a plurality of functional units including:
an image preprocessing unit configured to extract a component edge from an input component image by using a predetermined edge detecting technique, and detect a component region by using the extracted component edge;
a feature extracting unit configured to extract a component feature from the detected component region, and create a feature vector by using the extracted component feature; and
a component recognizing unit configured to input the created feature vector to an artificial neural network which has learned in advance to recognize a component category through a plurality of component image samples, and recognize the component category according to a result, wherein after extracting a first component feature from a binary component region when the component region is converted into a binary image and extracting a second component feature from a grey component region when the component region is converted into a grey image, the feature extracting unit combines the detected first component feature and the detected second component feature, and creates the feature vector therefrom, wherein the first component feature is a first component edge and the second component feature is a second component edge, and wherein the edge detecting technique is one of a second derivative calculation technique and a local adaptive binarization technique.

8. A component recognizing method, comprising:
extracting component edges from an input component image by using a plurality of edge detecting techniques, and detecting a component region by using the extracted component edges;
extracting a component feature from the detected component region, and creating a feature vector by using the extracted component feature; and
inputting the created feature vector to an artificial neural network which has learned in advance to recognize a component category through a plurality of component image samples, and recognizing the component category according to a result, wherein in the creating of the feature vector, after a first component feature is extracted from a binary component region when the component region is converted into a binary image and a second component feature is extracted from a grey component region when the component region is converted into a grey image, the detected first component feature and the detected second component feature are combined with each other, and the feature vector is created therefrom, wherein the first component feature is a first component edge and the second component feature is a second component edge, and wherein the edge detecting techniques include a second derivative calculation technique and a local adaptive binarization technique.

9. The component recognizing method of claim 8, wherein in the detecting of the component region, after a first component edge is detected by applying the second derivative calculation technique to the component image and a second component edge is detected by applying the local adaptive binarization technique to the component image, the detected first component edge and the detected second component edge are combined with each other, and the component region is detected according to a combination result.

10. The component recognizing method of claim 9, wherein in the detecting of the component region, after noise is removed by performing filtering for smoothing the component image, the first component edge is detected by applying the second derivative calculation technique to the smoothed component image.

11. The component recognizing method of claim 9, wherein in the detecting of the component region, after noise is removed by performing a filtering for smoothing the component image, the second component edge is detected by applying the local adaptive binarization technique to the smoothed component image.

12. The component recognizing method of claim 8, further comprising:

estimating a posture angle of the component by using a main line element of a silhouette of the component whose category has been recognized.

13. The component recognizing method of claim 12, wherein in the estimating of the posture angle, the main line element of the silhouette of the component whose category has been recognized and a main line element of a silhouette of a 3D model component stored in a database in advance are compared, and the posture angle of the component is estimated according to a comparison result.

14. A component recognizing method, comprising:
   extracting a component edge from an input component image by using a predetermined edge detecting technique, and detecting a component region by using the extracted component edge;
   extracting a component feature from the detected component region, and creating a feature vector by using the extracted component feature; and
   inputting the created feature vector to an artificial neural network which has learned in advance to recognize a component category through a plurality of component image samples, and recognizing the component category according to a result,
   wherein in the creating of the feature vector, after a first component feature is extracted from a binary component region when the component region is converted into a binary image and a second component feature is extracted from a grey component region when the component region is converted into a grey image, the detected first component feature and the detected second component feature are combined with each other, and the feature vector is created therefrom,
   wherein the first component feature is a first component edge and the second component feature is a second component edge, and wherein the edge detecting technique is one of a second derivative calculation technique and a local adaptive binarization technique.

* * * * *